Patented Aug. 8, 1939

2,169,207

UNITED STATES PATENT OFFICE 2,169,207

MANUFACTURE OF CELLULOSE XANTHATE DERIVATIVES AND ARTIFICIAL MATERIALS THEREFROM

Leon Lilienfeld, Vienna, Austria; Paul Abel, Vienna, Austria (Germany), or in case of his inability to act Emerich Hunna, Vienna, Austria (Germany), executors and Antonette Lilienfeld, Vienna, Austria (Germany), sole heir of Leon Lilienfeld, deceased No Drawing. Application March 8, 1932, Serial No. 597,640. In Great Britain March 31, 1931

34 Claims. (Cl. 18—54)

The present invention resides in the inventive idea of using in the preparation of a solution for the manufacture of artificial materials (i. e. artificial structures), the products obtainable by contacting cellulose xanthate with one or more polyvalent organic bodies, i. e. suitable substituted di- or polyhydroxy organic compounds (which may or may not contain one or more free hydroxyl groups) containing sulphur and halogen, which two elements are arranged in the molecule of the organic compounds in such a manner that at least one sulphur atom is attached to carbon and that at least one halogen atom is attached to carbon. The two are preferably attached to different carbon atoms. If more than one sulphur and/or halogen atom are contained in the molecule of the organic compound, there should be among them at least one sulphur atom attached to a carbon atom and at least one halogen atom attached to a carbon atom, and preferably these are two different carbon atoms.

Such compounds, and the mode of preparing same being described and claimed in a concurrent application, Serial No. 597,641 (now Patent 2,100,968). As described in my said concurrent application, a halogen compound of a polyhydric alcohol, such as a dichlorhydrin, can be reacted with less than the stoichiometrically equivalent quantity of a sulphide or hydrosulphide of an alkali-forming metal to form a compound containing both sulphur and a halogen (with or without one or more hydroxyl groups).

Thus in Example 1 of said application, 930 parts of an aqueous 50% solution of crystallized sodium sulphide ($Na_2S \cdot 9H_2O$) are reacted with 1000 parts of $\alpha$ dichlorhydrine, the temperature rising to 60–70° C., and after stirring for 6–8 hours, and allowing to stand over night, the nearly clear oily reaction product is separated from the aqueous liquor. The oily product can be purified by washing with water, or carbon tetrachloride, dissolved in alcohol or ether and precipitated therefrom by carbon tetrachloride, or by fractional distillation in a vacuum.

The proportions of the reacting materials can be substantially varied.

In Example 2 of said application 1860 parts of a 50% aqueous solution of crystallized sodium sulphide are reacted with 1000 parts of $\alpha$-dichlorhydrine, under conditions similar to those of Example 1 thereof, thereby forming two products, one soluble in ether and one insoluble therein.

In Example 4 of said application 597,641, 932 parts of sodium sulphide are reacted with 1000 parts of dichlorhydrin, both being used in alcoholic solution and the reaction conducted at about the boiling point of alcohol. This forms a yellowish, clear, oily material soluble in alcohol.

In Example 5 of said application, 1864 parts of sodium sulphide are reacted with 1000 parts of dichlorhydrin, under like conditions, forming a clear yellow viscous oily substance.

The products of these examples are referred to hereinafter.

Applicant's systematic experiments based upon this idea, in which experiments a considerable number of reagents of the aforementioned types (without, of course exhausting the whole field of all possible compounds of the class) where contacted with viscose and the thus obtained products worked up into artificial materials, have proved not only that the idea is workable, but also that it leads to artificial structures of technical value.

As stated above, the invention consists:

(1) In contacting cellulose xanthate, preferably in the form of its solution (viscose) with one or more suitable substituted polyhydroxy organic compounds (which may or may not still contain one or more free hydroxyl groups), and containing sulphur and halogen which two elements are arranged in the molecule of the said organic compound in such a manner that at least one sulphur atom is attached to carbon and that at least one halogen atom is attracted to carbon. If more than one sulphur and/or halogen atom are contained in the molecule of the said organic compound, there should be among them at least one sulphur atom attached to carbon and at least one halogen atom attached to carbon.

(2) In working up the thus obtained products into artificial structures, for example artificial threads.

The reagents characteristic of the invention may also be defined as follows: halogen derivatives of sulphur-analogues (sulphydrates, mercaptans) (which may or may not contain free hydroxyl groups) or di- or polyhydric alcohols, or halogen derivatives of derivatives of sulphur or analogues or di- or polyhydric alcohols, such as analogues or di- or polyhydric alcohols halogen derivatives, or di- or poly sulphides (which may or may not contain one or more free hydroxyl groups).

Many of the reagents in question may be prepared by acting with inorganic sulphides or inorganic sulphydrates on halogen derivatives of di- or polyhydric alcohols. They may also be defined as sulphur derivatives, such as mercaptans or sulphides of halogen derivatives, of di- or polyhydric alcohols, which sulphur derivatives may or may not contain one or more free hydroxyl groups. The halogen derivatives are probably hydro-halogen esters, e. g. chlorides.

There may be mentioned as examples of reagents, suitable for the purpose of the invention, such sulfur derivatives of glycerine or its homologues such as mercaptans or sulphides of glycerine, or of its homologues, as contains at least one halogen atom and at least one hydroxyl group, or in other words, mercaptans or sulphides of glycerine, or of its homologues, in which at least one halogen atom is attached to a carbon atom and in which at least one hydroxyl group is attached to another carbon atom.

The carrying out of the present invention is comparatively simple.

The part of the invention which is concerned with the preparation of the initial materials consists in principle in bringing together cellulose xanthate, preferably in the form of its solution (viscose) with one or more reagents of the aforementioned types, or with one or more derivatives of one or more reagents of the aforementioned types, provided that such derivatives are also of the aforementioned types, or, where feasible, with substances or mixtures of substances which either by reacting with each other or with bodies contained in the cellulose xanthate or viscose may give rise to the formation of one or more reagents of the aforementioned types or of derivatives thereof.

The chosen reagent or reagents may be added to the cellulose xanthate during the sulphidising step, but if so desired after at least part of the cellulose xanthate has already formed, or after the sulphidising step, but before the dissolving of the cellulose xanthate takes place, or at any subsequent stage prior to the conversion of the product into an artificial material, for instance prior to spinning.

The cellulose xanthate (viscose) to be employed in the present invention, as initial material for the manufacture of the products to be converted into artificial materials, may be prepared according to any method known in the viscose art from unmatured alkali cellulose or from alkali cellulose that has been matured for a shorter (for example 12 to 36 hours) or a longer (for example 48 to 60 hours) time. The alkali cellulose may be prepared either by impregnating the cellulose with an excess of caustic alkali solution and removing the excess of the caustic alkali solution by pressing, centrifuging or the like, or by mixing the cellulose with such a quantity of caustic alkali solution of such strength as, from the start, to incorporate with the cellulose no greater a proportion of caustic alkali than is desired in the sulphidising step and/or in the final viscose (cellulose xanthate solution). If just the quantity of caustic alkali desired in the viscose has been incorporated with the cellulose, the sulphidised mass may be dissolved in water alone, whilst, if a proportion of alkali smaller than desired in the viscose has been introduced into the cellulose, the sulphidised mass may be dissolved in a caustic alkali solution of such strength as, together with the caustic alkali and water contained in the sulphidised mass, to yield a viscose containing the contemplated percentage of cellulose and caustic alkali.

As a guiding line with regard to the question whether or not the alkali cellulose should be allowed to mature before being brought together with the carbon bisulphide may, among others, serve the desired viscosity of the solution which is to be worked up into artificial material in general and artificial threads in particular, and in connection therewith the viscosity of the kind of cellulose contemplated. If it is desired to give the solution a definite viscosity, then the alkali cellulose produced from the kind of cellulose contemplated is subjected to a maturing process, if without maturing this kind of cellulose yields a higher viscosity. If, however, it exhibits from the first, that is without maturing, the desired degree of viscosity, the maturing is superfluous. Now as the viscosities of the different kinds of cellulose on the market (linters and wood-pulp) differ very much from one another, the question of maturing depends in most cases on the one hand on the viscosity desired in the solution of the product intended for the manufacture of artificial material, and on the other hand on the viscosity of the kind of cellulose being worked.

The contacting of the viscose with one or more reagents of the aforementioned types may take place at room temperature or at any temperature not very far from room temperature. If desired, however, the bringing together of the viscose with one or more reagents of the aforementioned types may also take place at a raised temperature, say at 50° to 70° C.

The reagents of the aforementioned types may be incorporated with the viscose in the absence or presence of suitable diluents, for example anhydrous or aqueous acetone or water or the like.

According to the nature of the chosen reagent or reagents of the aforementioned types and the quantity of the reagent or reagents used for the quantity of cellulose xanthate under treatment, the time between the contacting step and working up into artificial materials is capable of variation within comparatively wide limits, for instance between the time necessary for filtration and say 120 hours and more.

Instead of cellulose xanthate (viscose), one of the other cellulose compounds containing one or more CSS-groups, for example a cellulose xanthofatty acid or a cellulose dixanthate or a cellulose xanthic acid ester or a xanthate of any cellulose derivative or any cellulose compound, for example a xanthate produced according to my U. S. specification Ser. No. 435,647, or Ser. No. 521,023, or Ser. No. 521,017, or Ser. No. 521,018, or Ser. No. 556,719, may be used as the material with which one or more of the reagents of the aforementioned types are contacted.

Consequently, in the specification and claims, wherever the context permits, where the expression "cellulose xanthate" or "viscose" is found, it will be understood that all other cellulose derivatives containing at least one CSS-group, can be used.

Technically interesting results are obtained when the xanthates produced according to any one of the inventions described in my U. S. Patent 1,858,097 or in my U. S. applications Ser. No. 556,719, 521,018 and 521,017 and 521,023 are contacted with one or more of the reagents characteristic of the present invention.

In my copending application 435,647 (Patent No. 1,858,097) I have described the manufacture of new cellulose compounds by acting on an oxyalkyl derivative of cellulose (e. g. made by reacting on alkali cellulose with a halohydrine) with $CS_2$ in the presence of a basic substance (e. g. caustic alkali). The product can be dissolved in dilute alkali solutions.

In copending application 556,719 filed Aug. 12, 1931, I have described a manufacture of certain new derivatives of cellulose by xanthating products made by acting on cellulose in the presence of a basic substance (preferably alkali cellulose) with di- or poly-halogen paraffins, halogen olefines, halogen derivatives of ethers of monohydric alcohols, halogen derivatives of aldehydes and ketones, sulphochlorides of tertiary amines, halogen derivatives of higher fatty acids having at least 6 carbon atoms, halogen derivatives of olefine monocarboxylic acids, halogen alkylamines, halogen aralkylamines, halogen derivatives of oxy-acids, halogen derivatives of keto-carboxylic acids, halogen derivatives of nitro-methane, urea halides (alkyl, aryl or aralkyl urea halides) trithiocarbonic acid esters, halogen derivatives of cyanogen, halogen derivatives of di-carboxylic acids, organic and inorganic esters of di- or polyhydric alcohols, certain halogenated paraffins, sulphochlorides of aromatic hydrocarbons, halogenated derivatives of alkyl phenyl ethers, acid esters of phenols, acid halides, halogen derivatives of aromatic monocarboxylic acids, halogen hydracid esters of phenyl glycols and of phenyl glycerines, and derivatives (e. g. ethers) thereof, phenyl alkylene oxides, phenyl-halogen-fatty acids, halogen derivatives of phenyl-paraffin-alcohol acids, phenyl acetylene, halogen derivatives of olefine-benzols, halogen derivatives of phenyl-olefine alcohols or oxy-phenyl-olefine alcohols, halogen derivatives of pseudophenols, of methylene quinones and quinols, sulphochlorides of phenyl-mono-oxy-carboxylic acids and chloro- or nitro-substitation products thereof, halogen derivatives of condensed nuclei and of hydro-naphthalene compounds, or halogen derivatives and sulphochlorides of hetrocyclic ring compounds having nitrogen in the ring.

The xanthated products con be dissolved in alkali solution and worked up similarly to viscose.

In my copending case 521,017 filed March 7, 1931, I have described xanthation of alkyl or aralkyl ethers of cellulose, by acting thereupon with $CS_2$ in the presence of an alkali. The products can be dissolved in alkaline solution and worked up like viscose.

In my application 521,023 of March 7, 1931, I have described the xanthation of alkyl or aralkyl ethers or halogen fatty acid esters of cellulose, and the products can be worked up similarly to viscose.

If desired, one or more suitable inorganic or organic substances known in the viscose silk art, for example glycerine or glucose, or sodium sulphate, or sodium sulphite, or sodium bisulphite, or ammonium sulphate, or an alkali aluminate, or an alkali silicate, or ammonia, or an alkali phosphate, or a bluish colouring matter, or an oxidising agent (such as a peroxide), or a sulphonated fatty oil (for example Turkey red oil), or finely divided sulphur, or a protein, or a proteid, or a phenol, or a naphthol, or an aldehyde, or a ketone may be added to the solutions of the products resulting from contacting viscose with one or more reagents of the aforementioned types, or to the viscose before the contacting step. These substances may be added in any stage of the manufacture, i. e. either to the cellulose xanthate before its dissolution or to the viscose or to the product resulting from the contacting of the viscose with one or more of the reagents of the aforementioned types.

The second part of the process, namely the production of artificial structures, for instance artificial threads, films, bands and the like, is carried out in such a manner that one of the products obtained by contacting viscose with one or more of the reagents of the aforementioned types is brought into the form of an artificial structure and thereafter so treated, as to cause separation of a solid therefrom. The simplest and most advantageous procedure is to allow the product of the contacting of viscose with one or more reagents of the aforementioned types to enter through suitable shaped openings into a coagulating bath, for example any one of the coagulating baths known in the viscose art or in the art of making artificial structures from any other alkali soluble cellulose derivatives, cellulose compounds or cellulose conversion products.

The bath may have only a coagulating effect on the shaped solution or a coagulating effect on the shaped solution and a plasticising effect on the artificial structure during or after its coagulation.

For the latter modification of the second part of the present invention, particularly suitable coagulating and plasticising baths are such baths as contain not less than about 20 to 40, preferably not less than 45 per cent. of $H_2SO_4$, or an equivalent quantity of another mineral acid. Other agents exerting a similar effect may however be used, for instance baths consisting of, or containing by itself or in admixture with one or more other organic or one or more inorganic substances, a large proportion of one or more of the following:

Acid esters formed from a polybasic inorganic acid and a monohydric or polyhydric aliphatic or aromatic alcohol (for example methylsulphuric or ethylsulphuric acid or a mixture of methyl or ethyl alcohol or of one of their hydrates with concentrated sulphuric acid), or Glycerophosphoric acid, or glycerosulphuric acid, or a mixture of glycerine with concentrated sulphuric acid, or Sulphonic acids of aliphatic or aromatic hydrocarbons (for example oxy-(hydroxy) methyl-sulphonic acid or methionic acid or methyl- or ethyl-sulphonic acid or a sulphonic acid of a mineral oil or benzol-sulphonic acid or phenolsulphonic acid by itself or in admixture with sulphuric acid), or Carboxy-organo-mineral acids (for example sulphono-di-acetic acid or sulpho-acetic acid by itself or in admixture with sulphuric acid), or Aromatic sulpho-acids containing nitrogen by themselves or in admixture with sulphuric acid, or Baths in which sulphuric acid of less than 55 per cent. strength is used in combination with acid salts, such as bisulphates, for instance ammonium bisulphate, or Strong sulphuric acid containing formaldehyde or pyridine or any other organic substance, or Solutions of zinc halides alone or mixed with an acid or with another salt or both, or Any other plasticizing agent or equivalent for strong mineral acid.

The strong sulphuric acid or the other mineral acids or other plasticizing agents mentioned above may be used alone or (so far as is in conformity with the conditions of operation) mixed with one of several inorganic substances, for instance with one or several other strong mineral acids, such as hydrochloric acid, nitric acid, or phosphoric acid, or with a neutral or acid salt, such as sodium sulphate or sodium bisulphate, or ammonium bisulphate, ammonium sulphate, magnesium sulphate, zinc sulphate, sodium bisulphite, sodium sulphite, sodium nitrite or boric acid. To the plasticizing agents (such as strong sulphuric acid or another mineral acid or the other plasticizing agents mentioned above) or to a mixture of these with another strong acid or with one or several of the above-named inorganic substances, may be added (so far as is in conformity with the conditions under which the mineral acids or other plasticising agents are used) a suitable quantity of one or several organic substances, such as glycerine, or a sugar, such as glucose, or an alcohol, or a salt of an organic base, for instance, an aniline salt, or pyridine, or a pyridine salt or an aldehyde, or an organic acid, such as acetic acid, or formic acid, or lactic acid, or oxalic acid.

It is to be understood that, in the modification of the invention in which the coagulating baths that have only little or no plasticising effect on the freshly coagulated artificial material are used, all suitable baths known in the viscose are and/or in the art of making artificial materials, particularly threads, from any alkali-soluble derivatives or conversion products of cellulose and from alkaline cellulose solutions, are meant to be included in the expression "coagulating baths" or "coagulating agents" wherever this expression is used to define such baths as have little or no plasticising effect on the freshly coagulated material. Consequently, not only the so-called Mueller-bath or any modification thereof and/or the baths set forth in the relative examples come into consideration as coagulating baths in the present process, but all baths known in the viscose art regardless of whether or not, in addition to the purely coagulating constituents, such as acids and/or acid or neutral salts, they contain any other inorganic or organic (liquid, oily, crystalline or colloidal) substance or substances.

The modification of the invention in which plasticising media are used, may also be so conducted that, first of all, the solution is caused to enter through suitably formed openings, into a bath which has a coagulating effect on the solution, but little or no plasticising effect on the freshly coagulated artificial material, and then the artificial material, preliminarily coagulated, is treated with a medium which exerts a plasticising effect, for instance with a bath having a high content of strong mineral acid, particularly having a content of at least 20 to 40 per cent, of sulphuric acid monohydrate, or any other plasticising bath, for instance one of the plasticising baths aforementioned.

This latter method of conducting the process therefore requires two baths in sequence. The second bath serves to plasticise. The first bath may be of such nature that the parent solution coagulates in water-soluble or water-insoluble form, for instance a solution of ammonium sulphate, or sodium bisulphate, or dilute sulphuric acid; or a liquid containing ammonium sulphate and sulphuric acid, or one of the various baths known in the viscose silk art, such as the Mueller-bath or the like. After having been conducted for a certain distance through such a bath, the artificial material is introduced into a second bath, namely one which has a plasticising effect on the coagulated artificial material, for example a bath composed of one or several strong mineral acids, or containing one or several strong mineral acids, for instance not less than 20 to 40 per cent. of $H_2SO_4$, or an equivalent amount of another strong acid.

Regardless of whether the plasticizing modification of the second phase of the present process is conducted in one or two baths, the action of the plasticising agent in the bath or outside the bath must not be continued so long as to cause serious damage to (or even destruction of) the coagulated artificial material. Consequently, in cases in which such coagulating and plasticising or plasticising baths are used as are capable of deteriorating the coagulated artificial material, it is important to interrupt the action on the artificial material, for example thread, of the plasticising agent in general and of the strong acid in particular, by starting the washing process in good time or by using other means for instance by exposing the artificial materials, for example threads to a low temperature.

The checking of the action of the plasticising agent in general and that of the strong acid in particular, is preferably arranged before or when the artificial material or threads arrive at the collecting device (spools, reels, centrifuges or the like). Only when the artificial materials, particularly threads, are collected in very thin layers, can the interruption of the action of the plasticising agent, and particularly of the strong mineral acid, be postponed for a short time. For practical reasons, however, it is not advantageous to collect in thin layers.

If desired, the artificial materials, for example artificial threads, may be exposed to additional stretching during any stage of their production, for example between the outlet (or spinning nozzle) and the collecting device, that is by subjecting it to a stretching greater than is necessary for the formation of the artificial material or thread and for conducting it from the outlet to the collecting device. This stretching may be effected by any of the known methods, either in the coagulating or in the coagulating and plasticising bath or between the coagulating or the coagulating and plasticising bath and the collecting device, or in both places. For instance, the distance between the collecting device and the bath may be made considerable, or the artificial material or thread may be conducted over rods, hooks, rollers or differential rollers, which are arranged in the coagulating or in the coagulating and plasticising bath or between the coagulating or the coagulating and plasticising bath and the collecting device or in the coagulating or coagulating and plasticising bath and between the coagulating or coagulating and plasticising bath and the collecting device. The stretching may also be effected by using a very high speed of drawing or spinning, for instance 100 to 120 metres per minute.

A high speed of drawing or spinning is generally to be recommended where working with additional stretch is desired, but when it is not desired to apply special devices for stretching in the course of the manufacture of the artificial material or the spinning of the artificial thread.

The other conditions of working during the second phase of the process—that is the manufacture of the artificial material—which must be observed, such as the temperature of the coagulating or of the coagulating and plasticising bath, the length of immersion of the artificial material, for example thread, in the coagulating or in the coagulating and plasticising bath, the speed of drawing or spinning, the length of passage of the artificial material, for example thread, through the air between the coagulating or the coagulating and plasticising bath and the collecting device, and, if additional stretch is applied, the degree of additional stretching—may be modified within wide limits.

The desulphurisation and/or purification of the artificial materials produced according to the present invention, may be effected in any known manner, the process described in my U. S. Patent 2,004,875 included. Said process comprises treating artificial materials which contain sulphur and apparently also certain yellowish to brownish colored by-products from some of the reactions, with sodium sulphide solution substantially stronger than that commonly used for desulphurization of viscose silk.

After having been washed, the artificial materials, for example threads, may be steamed or heated before or after the drying process.

If desired, the extensibility of the artificial materials, particularly threads, produced according to the present process, may be still more increased by treating them with shrinking agents, for example according to the processes described in my U. S. patent applications Ser. Nos. 186,575, 308,589, 367,150 and 367,154 (see U. S. Patents 1,989,098 to 1,989,101 and 2,001,621).

Thus the artificial materials can be subjected to action of caustic alkali solution, akali sulphide solution or mixtures of these, or alkali solution and carbon bisulphide, to increase the extensibility and elasticity of the products.

It is impossible to indicate every condition for success in every particular case, and it is to be understood that preliminary experiments cannot be avoided to find out what are the conditions necessary for success when using a particular cellulose, a particular alkali cellulose, a particular method of xanthation, a particular viscose, a particular reagent or mixture of reagents of the aforementioned types, particular quantitative proportions, particular working conditions, such as temperature, time or the like in the step of acting on viscose with the chosen reagent or reagents, and particular details of the operations connected with the second phase of the invention, i. e. with the production of the artificial materials, for instance the spinning operation.

The following examples will further serve as practical illustrations of the invention, which, however, is in no way limited to the examples themselves or to the working conditions given in the examples, such as proportions, temperatures, times of reaction, viscosities employed in the preparation of the initial materials, as well as in the preparation of the artificial materials therefrom, or to the composition of the spinning baths, etc. the parts are by weight:

*Example I (a) to (p)*

100 parts of wood-pulp or cotton linters are introduced into 2000 parts of caustic soda solution of 18 per cent. strength at a temperature of 15° C. and left therein for 3 hours. The alkali cellulose is then pressed until it weighs 300 to 400 parts and thereafter is shredded at a temperature of 11 to 15° C. for 2½ to 3 hours, whereupon 60 parts of carbon bisulphide are added, and the carbon bisulphide is allowed to act for about 8 hours at a temperature of 18 to 20° C.

If the particular cellulose used, without maturing the alkali cellulose, gives a viscose exhibiting the desired degree of viscosity, the addition of the carbon bisulphide takes place immediately or a short time after shredding. But, if the viscosity of the viscose obtainable from the chosen cellulose is, without maturing the alkali cellulose, higher than desired, the carbon bisulphide is added, after the shredded alkali cellulose has in known manner matured for so long a time as to yield a viscose of the desired viscosity.

After the reaction with the carbon bisulphide is completed, any excess of carbon bisulphide is blown off during 10 to 15 minutes, and the xanthate so produced is dissolved in such a quantity of a caustic soda solution of appropriate strength as to yield a viscose containing about 6.5 per cent. of cellulose (analytically determined by precipitation) and 8 per cent. of NaOH.

As soon as the dissolution is complete, 50 parts of the product of Example 1 of my U. S. Patent 2,100,968 are added. This product may be in the crude state (i. e. simply freed from the mother liquor by decantation) or in the purified state (for instance after purifying it by extraction with carbon tetrachloride, or by dissolution in alcohol and precipitation with carbon tetrachloride, or after purifying it by distilling off, in vacquo, the constituents volatile at up to 92° C. at a pressure of about 15 to 18 mm. or after purifying it by distilling off the constituents volatile at up to 110° C. or after purifying it by distilling off the constituents volatile at up to 125 to 150° C. at a pressure of about 15 to 18 mm.). Said product is preferably added in small portions to the viscose whole stirring and well stirred in.

Before being spun, the thus obtained solution is allowed to age for about 72 hours at a temperature of 15° to 20° C., during which time the solution is filtered three to four times through cotton, the last filtration being performed a short time before starting the spinning operation.

The spinning is conducted as follows:

(a) The spinning solution is pressed at a speed of 3 ccm. per minute through a platinum nozzle having 100 perforations of 0.08 mm. diameter each, into a bath containing 50 to 57 per cent. of $H_2SO_4$ and having a temperature of 16° C., the length of the immersion of the thread in the sulphuric acid being 20 to 80 cm. The thread is then allowed to pass for 70 to 120 cm through the air and is wound on a bobbin revolving so many times per minute as to produce a speed of spinning of about 30 metres per minute. The lower part of the bobbin revolves in water, so that the sulphuric acid is diluted as soon as the thread arrives at the bobbin. The threads are then washed, twisted, purified, for example according to the process described in my U. S. Patent 2,004,875 or by means of hot pyridine or alcoholic or aqueous solution of phenol, washed again, if desired and thereafter finished in the usual manner.

(b) The process is conducted as in (a), but with the difference that during its passage between the spinning bath and the bobbin, the thread is in any known manner subjected to additional stretch.

(c) The same mode of operation as in (a) or (b), but with the exception that the temperature of the spinning bath is 0° C.

(d) The process is conducted as in (a) or (b), but with the exception that the temperature of the spinning bath is 30° to 40° C.

(e) Mode of procedure as in (a) or (b) or (c) or (d), but with the difference that 6.2 ccm. of the spinning solution are discharged per minute, that the speed of spinning is 40 m. per minute and that the spinning bath contains 54 to 58 per cent. of $H_2SO_4$.

(f) Mode of operation as in (a) or (b) or (c) or (d), but with the difference that 3.3 ccm. of the spinning solution are discharged per minute, that the platinum nozzle has 54 perforations of 0.1 mm. diameter, that the speed of spinning is 18 m. per minute and that the concentration of the spinning bath is 58 to 62 per cent. of $H_2SO_4$.

(g) Mode of procedure as in (a) or (b) or (c) or (d), but with the difference that the platinum nozzle has 24 perforations of 0.1 mm. diameter, that the speed of spinning is 18 m. per minute and that the spinning bath contains 58 to 62 per cent. of $H_2SO_4$.

(h) The process is conducted as in (a) but with the difference that the spinning solution is discharged at a speed of about 14 ccm. per minute and that the speed of spinning is about 100 to 120 m. per minute.

(i) Mode of procedure as in (a) to (h), but with the difference that the sulphuric acid is from the beginning saturated with sodium sulphate or magnesium sulphate.

(k) Mode of procedure as in (i), but with the difference that the strengths of sulphuric acid are somewhat higher, on the average, by about 2 to 6 per cent. of $H_2SO_4$.

(l) The same mode of procedure as in (a) to (h) but with the difference that the coagulating bath contains 20 to 40 per cent. of $H_2SO_4$.

(m) Mode of procedure as in (l), but with the exception that the coagulating bath is saturated with sodium sulphate or sodium bisulphate or ammonium bisulphate.

(n) Mode of procedure as in (a) or (b) or (c) or (d) or (e) or (f) or (g) or (h), but with the difference that the spinning bath contains 10 to 15 per cent. of sulphuric acid.

(o) Mode of procedure as in (a) or (b) or (c) or (d) or (e) or (f) or (g) or (h), but with the difference that the spinning bath is a solution containing 15 to 20 per cent. of $H_2SO_4$ and 15 per cent. of sodium sulphate.

(p) Mode of procedure as in (a) or (b) or (c) or (d) or (e) or (f) or (g) or (h), but with the difference that the spinning bath is a solution containing 8 to 12 per cent. of $H_2SO_4$ and 28 per cent. of $Na_2SO_4$ the temperature of the spinning bath being either 16° or 40 to 45° C.

Example 2 (a) to (p)

The process is conducted as in any one of the Examples 1 (a) to (p), but with the difference that, instead of 50 parts, 40 parts of the crude or purified product of Example 1 of my said patent 2,100,968 are contacted with the viscose.

The strengths of the spinning acids in methods (a) to (i) are somewhat higher than in Example 1 (a) to (i).

Example 3 (a) to (p)

Mode of procedure as in any one of the Examples 1 (a) to (p) or 2 (a) to (p), but with the exception that the spinning solution is allowed to age for about 48 or 96 hours.

Example 4 (a) to (p)

The process is conducted as in any one of the Examples 1 (a) to (p), but with the difference that, instead of 50 parts, 30 parts of the crude or purified product of Example 1 of my said patent 2,100,968 are contacted with the viscose, and that the thus obtained spinning solution is allowed to age for 96 to 190 hours.

The concentrations of the spinning acids in the methods (a) to (i) are higher (for example by about 3 to 6 per cent. of $H_2SO_4$) than in Example 1 (a) to (i).

Example 5 (a) to (p)

The process is conducted as in any one of the Examples 3 (a) to (p) or 4 (a) to (p), but with the difference that the cellulose xanthate is dissolved in such an amount of caustic soda solution of appropriate strength as to yield a viscose containing about 6.5 per cent. of cellulose (analytically determined by precipitation) and 5 per cent. of NaOH.

Example 6 (a) to (p)

The parent viscose is prepared as in Example 1, but with the difference that as starting cellulose such wood-pulp or cotton linters are, ceteris paribus, used as yield viscose of pronounced high viscosity and that for the dissolving of the xanthate such a quantity of caustic soda and water is used as to yield viscose containing about 3 per cent. of cellulose (determinable by analysis) and 5 per cent. of NaOH, the viscosity of the thus prepared viscose being about 1 to 2 as compared with glycerine of 31° Bé. (1.26 specific gravity).

Immediately after the dissolution of the cellulose xanthate, 50 parts of the crude or purified product of Example 1 of my said patent 2,100,968 are contacted with the viscose and the thus obtained solution allowed to age for 72 to 96 hours at 15° C.

The spinning solution is spun as in Examples 1 (a) to (h), but with the difference that the amounts of spinning solutions discharged per minute and the concentrations of the spinning baths are as follows:

Spinning methods (a), (b), (c) and (d)

Quantity of spinning solution discharged per minute: about 6.8 ccm.

Concentration of the spinning bath: 55 to 65 per cent. of $H_2SO_4$.

Spinning method (e)

Quantity of spinning solution discharged per minute: about 14.3 ccm.

Concentration of the spinning bath: 57 to 67 per cent. of $H_2SO_4$.

Spinning method (f)

Quantity of spinning solution discharged per minute: about 7.6 ccm.

Concentration of the spinning bath: 57 to 67 per cent. of $H_2SO_4$.

Spinning method (g)

Quantity of spinning solution discharged per minute: about 6.8 ccm.

Concentration of the spinning bath: 56 to 66 per cent. of $H_2SO_4$.

Spinning method (h)

Quantity of spinning solution discharged per minute: about 32 ccm.

Concentration of the spinning bath: 57 to 67 per cent. of $H_2SO_4$.

(i) Mode of procedure as in (a) to (h), but with the difference that the sulphuric acid is saturated with sodium sulphate or magnesium sulphate.

(k) Mode of procedure as in (i), but with the difference that the strengths of the sulphuric acid are somewhat higher, on the average by about 2 to 6 per cent. of $H_2SO_4$.

(l) The same mode of procedure as in (a) to (h), but with the difference that the coagulating bath contains 40 per cent. of $H_2SO_4$.

(m) Mode of procedure as in (l), but with the exception that the coagulating bath is saturated with sodium sulphate or sodium bisulphate or ammonium bisulphate.

(n) Mode of procedure as in (a) or (b) or (c) or (d) or (e) or (f) or (g) or (h), but with the difference that the spinning bath contains 10 to 15 per cent. of sulphuric acid.

(o) Mode of procedure as in (a) or (b) or (c) or (d) or (e) or (f) or (g) or (h), but with the difference that the spinning bath is a solution containing 15 per cent. of $H_2SO_4$ and 15 to 20 per cent. of sodium sulphate.

(p) Mode of procedure as in (a) or (b) or (c) or (d) or (e) or (f) or (g) or (h), but with the difference that the spinning bath is a solution containing 8 to 12 per cent. of $H_2SO_4$ and 28 per cent. of $Na_2SO_4$, the temperature of the spinning bath being either 16 or 40 to 45° C.

Example 7 (a) to (p)

The process is conducted as in any one of the Examples 6 (a) to (p), but with the difference that, instead of 50 parts, 75 parts of the crude or purified product of Example 1 of my Patent 2,100,968 are employed.

Example 8 (a) to (p)

The process is conducted as in any one of the Examples 6 (a) to (p), but with the difference that only 30 parts of the crude or purified product of Example 1 of my Patent 2,100,968 are employed, the strengths of the spinning acids in the methods (a) to (k) being somewhat higher (by about 2 to 5 per cent on the average) than in Example 6 (a) to (k).

Example 9 (a) to (p)

The process is conducted as in any one of the Examples 1 (a) to (p) to 8 (a) to (p), but with the difference that instead of the products of Example 1 of my said concurrent application, the ether soluble part thereof, isolated from its solution in ether either by distilling off the ether or by precipitation with carbon tetrachloride of the product of Example 2 of Patent 2,100,968 is employed.

Example 10 (a) to (p)

The process is conducted as in any one of the Examples 1 (a) to (p) to 8 (a) to (p), but with the difference that, instead of the products of Example 1 of my said concurrent application, the ether insoluble part of the product of Example 2 of my Patent 2,100,968 is employed, the concentrations of the spinning baths (a) to (k) being higher by about 2 per cent. to 6 per cent. of $H_2SO_4$ than in Example 1 (a) to (k).

Example 11 (a) to (p)

The process is conducted as in any one of the Examples 1 (a) to (p) to 8 (a) to (p), but with the difference that, instead of the products of Example 1 of my said concurrent application, the product of Example 5 of my Patent 2,100,968 is employed.

Example 12 (a) to (p)

The process is conducted as in any one of the Examples 1 (a) to (p) to 8 (a) to (p), but with the difference that, instead of the products of Example 1 of my Patent 2,100,968, the product of Example 3 or Example 4 of my said patent is employed.

Example 13 (a) to (p)

The process is conducted as in any one of the Examples 1 (a) to (p) to 8 (a) to (p), but with the difference that, instead of the products of Example 1 of my Patent 2,100,968, the products of Example 6 of said patent, namely either the fraction distilling under reduced pressure at 65 to 100° C., or the fraction distilling under reduced pressure at 100 to 140° C. or the alcohol-soluble part, or the alcohol-insoluble part of the product is employed.

Example 14

One of the spinning solutions produced according to any one of the foregoing examples is spun in the known manner in one of the following baths:

(1) In a solution of ammonium sulphate of 25 to 30 per cent. strength, (2) In a bath consisting of 500 parts of sodium bisulphate, 76 parts of sulphuric acid of 66° Bé. and 587 parts of water, which bath may be kept at room temperature, or at a raised temperature, for instance 45° C., or (3) In a bath consisting of 982 parts of water, 180 parts of sodium sulphate, 60 parts of ammonium sulphate, 135 parts of glucose, and 128 parts of sulphuric acid of 66° Bé.

The coagulated thread is introduced from one of the baths cited into a bath of the following composition:

(1) Sulphuric acid of 70 per cent. of $H_2SO_4$, or (2) Sulphuric acid of 60 to 65 per cent. of $H_2SO_4$, or (3) Sulphuric acid of 55 per cent. of $H_2SO_4$, or (4) A solution of 13.3 parts of ammonium sulphate in 120 parts by weight of sulphuric acid of 62 to 70 per cent. of $H_2SO_4$.

The temperature of the second bath may be kept below room temperature, for instance at 0 to 10° C., or at room temperature, or even above room temperature, for instance at 25 to 45° C.

The length of immersion of the thread in the second bath may be small, for instance 20 cm. or also large, for instance 30 to 120 cm. or more.

If desired, the threads may be stretched by any one of the known methods, either in the second bath or after they have left it.

The threads are collected while the sulphuric acid is removed or diluted by washing as has previously been described, and thereafter they are washed, dried and finished in the manner described in Example 1.

Example 15

The process is conducted as in any one of the preceding examples, but with the difference that in the preparation of the alkali cellulose intended for making the viscose, the cellulose is not steeped in an excess of caustic soda solution and the excess of the latter removed by pressing, centrifuging or the like, but, from the very beginning, is mixed with a proportion of caustic soda solution (for instance of 13 to 20 per cent. strength) containing as much NaOH, as, or less NaOH than, is desired to have in the final viscose. For example, by mixing (in a shredder, or in a so-called Werner-Pfleiderer vacuum xanthate machine) 100 parts of the cellulose with 400 to 600 parts of caustic soda solution of 18 to 20 per cent. strength until the mass is homogeneous, then adding 60 parts of carbon bisulphide, allowing the carbon bisulphide to act for several hours and dissolving, (according to the proportion of NaOH, desired in the viscose), the xanthated mass either in water or in dilute caustic soda solution, it is easy to obtain viscoses having a composition equal or similar to the composition of the viscoses employed in the foregoing examples, the subsequent operations being of course the same as in the foregoing examples.

In all the foregoing examples, as far as they refer to strong acid or another plasticising agent that, if allowed to act upon the thread for too long a time, could damage the threads, the action of the acid may be interrupted also by subjecting the threads leaving the bath consisting of, or containing strong acids, to a low temperature, for instance —5 to —15° C. before they are washed, which, for instance, may be done by collecting them on a hollow spool containing a cooling agent, for instance solid carbonic acid, or a freezing mixture, or ice.

When the threads have been washed, they may be heated or steamed at high temperatures (for instance 100 to 110° C.) before or after the drying step.

Processes for the manufacture of staple fibre will be entirely apparent from the foregoing examples.

*Example 16*

A spinning solution, produced in the manner described in any one of the foregoing examples is introduced in the known manner into one of the coagulating or coagulating and plasticising baths named in the foregoing examples through a suitable hopper or slit, and the coagulated film band, after having been run through this bath is washed in the known manner and dried.

*Example 17*

A cotton fabric is impregnated or filled or coated, one or several times, on a suitable machine, for instance a padding machine, or a backfilling machine, or a spreading machine, with a spinning solution produced in the manner described in one of the foregoing examples, to which solution a filling material such as talc or china clay (for instance 100 to 200 per cent. calculated on the weight of the cellulose) or a dyestuff or a pigment, such as mica, or lamp-black, may be added and without being dried or after being dried, if desired in a state of tension, is passed through a bath having the composition of one of the coagulating or coagulating and plasticising baths mentioned in the foregoing examples. The dressed or coated fabric is then washed and dried.

*Example 18*

The cellulose xanthate (i. e. the reaction mass after the sulphidising step), obtained in Example 1 (a), produced from 100 parts of cellulose, as in said example, is dissolved in such a quantity of caustic soda and water as to yield a viscose containing about 15 to 20 per cent. of analytically determinable cellulose and 8 to 10 per cent. of caustic soda. After the dissolution, 10 to 20 parts of any one of the halogenated thioglycerines or halogenated glycerine-sulphides employed in the foregoing examples are stirred or kneaded into the viscose at 15 to 20° C., whereupon, either immediately after the incorporation of the halogenated sulphur derivative, or after having allowed the mass to stand for 12 to 24 hours at 10 to 15° C., the pasty solution is employed for pasting together one or more pair of sheets of cardboard or thick cloth or the like. If desired, the material may be pressed or calendered; it is then introduced into a coagulating or into a coagulating and plasticising bath and allowed to remain therein, until the acid bath has permeated the material, whereupon the material is washed free from acid and dried.

*Example 19*

In a kneading machine, 10 parts of any one of the halogenated thioglycerines or halogenated glycerine-sulphides employed in the foregoing examples, are thoroughly kneaded into a cellulose xanthate paste, for instance a paste containing 20 to 30 per cent. of analytically determinable cellulose and 10 to 15 per cent. of caustic soda. After the mass has become homogeneous, it is freed from gas bubbles (if any) for example in a vacuum kneader and then, either immediately after the kneading operation, or after having stood for 24 hours at 10 to 15° C. brought into the form of a thick plate. The thick plate is now introduced into sulphuric acid of about 60 per cent. strength at —5° C., where it remains until the plate solidifies. The coagulated thick plate is now washed free from acid, dried and, if desired, desulphurised and/or bleached as described in the examples relating to artificial threads.

*Example 20*

Instead of immersing the thick plate referred to in Example 19 into acid directly it may be first immersed in a solution of ammonium sulphate of 25 per cent. strength at 20° C., allowed to remain therein for a shorter or longer time (according to the thickness of the plate 10 minutes to 3 hours), and then be introduced into sulphuric acid of 55 to 60 per cent. strength at —5° C. for a short time, and then washed and dried.

*Example 21*

1000 parts of a spinning solution, produced in the manner described in any of the examples 1 to 13 are mixed with 50 to 60 parts of zinc white or finely divided mica, or with 10 to 20 parts of soot and then printed in a roller printing machine on a cotton fabric. After being printed, the cotton fabric is, (if desired, after being dried), introduced into one of the coagulating or coagulating and plasticising baths named in the foregoing examples, and, after having been run through this bath, washed free from acid and dried and, if desired, desulphurised and/or bleached.

The present process may also be carried out in such a manner that, instead of with one or more reagents of the aforementioned types, the cellulose xanthate or viscose respectively is, in addition to one or more reagents of the aforementioned types contacted with one or more halogen derivatives of di- or polyvalent alcohols, or with one or more halogen fatty acids, or with one or more trithiocarbonic acid esters, or with one or more reagents proposed in my U. S. application Ser. No. 521,020 (now Patent 2,021,864) for being contacted with viscose to produce a basic material for the manufacture of artificial threads or other products.

In stating, in the present specification and claims, that the sulphurized and halogenated reagents used in the present invention, for acting upon viscose, are derivatives of polyhydroxy organic compounds, it is not intended to imply that the said reagents still contain a plurality of hydroxyl groups (nor that they necessarily contain any hydroxyl group), but rather that the original compounds from which these are derived (e. g. glycerine), contain several hydroxyl groups. The reagents used preferably (although not necessarily) contain at least one hydroxyl group.

Insofar as the reagent or reagents intended for being contacted with the cellulose xanthate (viscose) in addition to one or more di- or polyvalent organic compounds that contain at least one sulphur atom and at least one acid residue, for example at least one halogen atom, are suitable for being used as starting materials for the preparation of di- or polyvalent organic compounds that contain at least one sulphur atom and at least one acid residue, for example at least one halogen atom, this mixed employment of reagents belonging to the groups set forth in the present specification on the one hand and the reagents set forth in the preceding paragraph on the other, may be effected by conducting the preparation of the parent reagent in such a manner that it contains a small or large proportion of the reagents to be contacted with the cellulose xanthate (viscose) in addition to one or more di- or polyvalent organic compounds which contain at least one sulphur atom and at least one acid residue, for example at least one halogen atom (see for instance that modification of the foregoing Examples 1 to 6 in which the crude product of Example 1 of my Patent 2,100,968 is employed, this product containing a considerable proportion of α-dichlorhydrine.

The said mixed employment can also be effected by simply contacting cellulose xanthate (viscose) with one or more di- or polyvalent organic compounds which contain at least one sulphur atom or at least one acid residue, for example at least one halogen atom, and with one or more halogen derivatives of di- or polyvalent alcohols, and with one or more halogen fatty acids, or with one or more trithiocarbonic esters or with one or more reagents belonging to the groups set forth in my U. S. application No. 521,020 (now Patent 2,021,864) the reagents of different types being incorporated with the cellulose xanthate (viscose) either in the form of a mixture (if they do not react with each other), or simultaneously but separately, or consecutively in optional order.

The following example illustrates this mixed application of various reagents of various types to the cellulose xanthate:—

*Example 22*

The process is conducted as in any one of the preceding examples, but with the difference that only 50 to 70 per cent. of the amount of the reagent contacted therein with the viscose is employed and that, simultaneously with, or subsequently to, the addition of that reagent, 10 to 20 parts of α-dichlorohydrine, or of α-monochlorohydrine, or of ethylene chlorohydrine, or of ethylene oxide, or of chloracetic acid in the form of its sodium salt, or of trithiocarbonic acid ester of glycerine, or of ethylene chloride, or of β-epidichlorohydrine, or of benzylglycol chlorohydrine, or of chloro-acetone, or of dichloroacetone, or of β-bromopropylamine hydrochloride, or of β-chloropropylamine hydrochloride, or of β-dibromopropylamine hydrochloride, or of β-dichloropropylamine hydrochloride, or of chloroethyldiethylamine hydrochloride, or of benzoyl chloride, or of para-toluenesulphochloride, or of ortho-chloronitrobenzene, or of cinnamic alcohol dibromide, or of diethyl sulphate, or of dimethyl sulphate, or of 1:2-dichlorether, or of glycerophosphoric acid or of diacetine are incorporated with the viscose and the thus obtained product, after having been allowed to age for 24 or 48 or 72 or 96 hours at 15° C. during which time it is filtered several times, is worked up into an artificial material in a manner similar to that described in the foregoing examples.

As a matter of course, it is very easy, by any known method (for example by incorporating with the solution intended for making the artificial material a gas or a substance capable of evolving a gas in the coagulating step, or a very finely divided liquid or solid substance that is insoluble in said solution and then removing this substance from the artificial material by extraction with appropriate solvents, or, if they are volatile, by evaporating them in vacuo or at atmospheric pressure at such temperatures as do not damage the artificial material) to produce, according to the present process, hollow threads or coatings or sizings or dressings or films or the like containing hollow spaces.

It is also easy, according to the present process, to produce artificial threads or coatings or films or the like of diminished lustre by any known method, for example by adding to the solution intended for making the artificial material such substances of mineral or animal or vegetable or synthetic origin as, according to the experience gained in the viscose silk art, are suitable for the reduction of the lustre of the artificial materials, for example threads or films or coatings or the like, for instance mineral or animal or vegetable oils or fats or soaps or aromatic hydrocarbons or their derivatives, or organic bases, such as aniline, or inorganic pigment-like materials (for instance salts, such as barium sulphate or a titanium salt) added to, or produced in the solution intended to be converted into the artificial material or in the artificial material during its manufacture.

In the foregoing examples, where desired or expedient, instead of the chlorine-derivatives the equivalent quantities of the corresponding bromine- or iodine derivatives and vice versa may be used.

*Example 23*

The process is conducted as in any one of the preceding examples, but with the difference that a solution or paste of a xanthate of a cellulosic body prepared according to any one of the inventions described in my U. S. applications Ser. Nos. 435,647, 556,719, 521,018, 521,017 and 521,023 is used as parent material instead of viscose. In other words: The reagents characteristic of the present invention are incorporated with a solution or paste of one of the xanthates prepared according to any one of the processes described in my applications enumerated in the preceding sentence instead of being incorporated with viscose. The respective xanthates may also contain a smaller or larger amount of unaltered cellulose xanthate.

As to the proportions: If the solutions or pastes of the xanthates prepared according to any one of the inventions described in my U. S. applications Ser. Nos. 435,647 (now Patent 1,858,097), 556,719, 521,018, 521,017 and 521,023 contain percentages of the xanthates and caustic soda equal to or similar to the percentage of the xanthates and caustic soda contained in the viscoses employed in the foregoing examples, the nature and the amount of the reagents used in any one of the foregoing examples to be incorporated with the xanthates, may be the same as in the preceding examples, the conversion into the artificial materials being carried out as described in the preceding examples.

Instead of the halogenated mercaptans or sulphides of glycerine, used in the foregoing examples, equivalent quantities of other agents of the types mentioned in the descriptive part preceding the examples may be used, for instance,

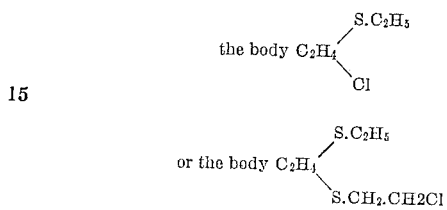

(Demuth and Meyer, Liebig's Annalen, vol. 240, pages 305 to 317), methyl iodide addition product of di-ethylene-disulphide (Demuth, Meyer, see above) ethane-dithiolethyl-$\beta$-chloro-ethyl ether, ethyl-$\beta$-chloro-ethyl-sulphide, $\beta$-$\beta'$-dichloro-diethyl-sulphide, $\beta$-$\beta'$-dichloro-diethyl-disulphide, $\beta$-$\beta$-dichloro-$\alpha$-ethoxy-diethyl-sulphide, chlorosulphonal, $\alpha$-sulphydryl-$\omega$-chlorostyrol in the form of its xanthic acid ester, $\alpha$-bromo-$\beta$-oxythionaphthene, $\alpha$-dibromo-$\beta$-keto-dihydrothionaphthene, trimethyl-thiosinamine-dibromide, [$\beta\gamma$-dibromo-propyl]-iso-thiocyanate, thiopropionic acid-($\beta\gamma$-dibromo-propylamide), N-[$\beta$-chloroallyl]-thiourea, bis-chloroacetyl-cystin and the like.

As far as they are concerned with baths containing a high percentage of $H_2SO_4$, the foregoing examples may also be modified by using hydrochloric acid of 32 to 40 per cent. strength instead of strong sulphuric acid. Instead of the strong sulphuric acid or hydrochloric acid, there may also be used strong nitric acid, for instance with a content of 40 to 90 per cent. of $HNO_3$, or strong phosphoric acid, for instance of 1 to 1.86 specific gravity (i. e. up to 99% $H_3PO_4$) or strong arsenic acid, for instance with a content of 50 to 90 per cent. of $H_3AsO_4$, or a strong zinc chloride solution of about 50 per cent. strength containing about 4 to 6 per cent. of hydrochloric acid or a strong solution of a sulphonic acid, for example a 60 to 70 per cent. solution of benzolsulphonic acid or phenolsulphonic acid, or glycero-sulphuric acid, or methylsulphuric acid, or ethylsulphuric acid, in short, any agent that has a plasticising effect on the freshly coagulated artificial material, for example thread. An inherent property of the products of this process is that even after being extracted with hot pyridine, and after being extracted with dilute caustic alkali solution at room temperature, they still contain organically combined sulphur, and upon being then decomposed with hydriodic acid solution, they yield alkyl iodide, and the products made by the above processes using glycerine derivatives, yield $C_3H_7I$. With regard to the physical properties of the artificial silk produced in accordance with the process of this case, the silk has the following useful properties:

(a) Soft feel, (b) Fine lustre (if no delustering agents are used), (c) Dry tenacity substantially exceeding 2 grams per denier and reaching or even exceeding 3 or 4 grams per denier, (d) Wet tenacity substantially exceeding 1 gram per denier and in many case reaching or exceeding 2 grams per denier, (e) Extensibility exceeding 7 to 8 per cent. and in many cases, reaching 12 to 15 or even 20 per cent.

It is important to note that, in many cases the extensibility of the artificial silk produced according to the present process is superior to the extensibility of the artificial silk produced according to the process of Patent No. 2,021,862. This is probably due to the plasticizing action of the introduced radical of the relative glycerine sulphur compound.

In the foregoing examples, in the preparation of the viscose, instead of sulphite cellulose or linters may be used any other suitable wood-pulp or near conversion products of wood cellulose or cotton, for example cotton or wood-pulp which has been pre-treated cold or hot with dilute acid, for instance hydrochloric acid or sulphuric acid, or with an organic acid, or mercerised cellulose, or regenerated cellulose in any available form, for example in the form of artificial fibres or waste artificial fibres, in short, any kind of cellulose material may be used which is used or has been proposed as starting material for making viscose or other cellulose derivatives, such as cellulose esters or ethers.

Furthermore, all such cellulose compounds of any kind (for example suitable alkyl-, oxyalkyl- or aralkyl ethers of cellulose or oxy-acid ethers of cellulose or inorganic or organic esters of cellulose etc.) as still contain free hydroxyl groups accessible to xanthation with formation of soluble xanthates, may be employed in the present invention as parent materials for the preparation of the cellulose xanthate to be contacted with the reagents characteristic of the present invention.

In the foregoing examples the cellulose xanthate and/or its solution (viscose) may be prepared in presence of a quantity of oxygen smaller than the amount contained in the surrounding air or in absence of oxygen, by conducting all or part of the operations under reduced atmospheric pressure or in presence of an inert gas, such as nitrogen or by adding reducing agents or both.

Although, according to general practice, the term "oxy" covers also "hydroxy", to avoid any misunderstanding, it is pointed out that in this specification, wherever the context permits, the term "oxy" is intended to cover "hydroxy" also.

In the specification, wherever the context permits, the expression "polyhydric alcohol" is intended to include: di- or polyhydric aliphatic alcohols and also di- or polyhydric aromatic alcohols in which only one hydroxyl group is present in each side chain (for example xylylene alcohol or mesitylene glycerine or the like) and also di- or polyhydric aromatic alcohols in which more than one hydroxyl group is present in one and the same side chain (for example phenyl glycol or phenyl glycerine). In other words "polyhydric alcohol" means any alcohol containing a plurality of hydroxyl groups.

The expression "artificial material" used in the specification includes: artificial threads, particularly artificial silk; films; coatings and layers of every kind; dressings for textiles, paper, leather and the like; sizing for yarns; book cloth; artificial leather; adhesives and cements; plates and plastic compositions in general; thickening agents or fixing agents for pigments in textile printing and the like.

The term "artificial threads" denotes artificial threads and spun goods of all kinds, for instance artificial silk, staple fibre, artificial cotton, artificial wool, artificial hair, and artificial straw of any kind.

The expression "strong mineral acids" denotes sulphuric acid of at least 20 to 40 per cent. of $H_2SO_4$, preferably at least 45 per cent. of $H_2SO_4$, and as regards the other mineral acids, solution of equivalent strength.

The term "a" used herein is intended to embrace one or several.

In the specification and claims, wherever the context permits, the expression "polyhydric" is intended to include di- or polyhydric.

The expression "sulphur analogues of polyhydric alcohols" used herein is intended to include mercaptans of di- or polyhydric alcohols and derivatives or mercaptans of di- or polyhydric alcohols, such as di- or poly-sulphides.

In the specification and claims, wherever the context permits, the expression "sulphur-group" derivative is intended to embrace mercaptans and sulphides as well as analogous compounds containing selenium or tellurium.

In the specification and claims, wherever the context permits, the expression "glycerine" is intended to include glycerine and its homologues.

What I claim is:

1. In the manufacture of artificial structures, the hereindescribed mode of manufacture of new intermediates, which comprises contacting under reacting conditions a cellulose xanthate with a polyvalent organic compound containing at least one atom of sulphur and at least one halogen atom which two elements are arranged in the molecule of the substituted polyvalent organic compound in such a manner that at least one sulphur atom is attached to a carbon atom and at least one halogen atom is attached to some other carbon atom.

2. A mode of manufacture of new intermediates suitable for the preparation of artificial structures, wherein a cellulose xanthate is contacted under reacting conditions with at least one organic substance containing organically bound sulphur and halogen, which is a halogen derivative of a sulphur analogue of a polyhydric alcohol.

3. A mode of manufacture of new intermediates suitable for the preparation of artificial structures, wherein a cellulose xanthate is reacted upon with at least one sulphur derivative of a halogen derivative of a polyhydric alcohol in which the halogen and sulphur are each attached to a different carbon atom.

4. A method as claimed in claim 1, wherein the reagent with which the cellulose xanthate is contacted, contains at least one hydroxyl group.

5. A mode of manufacture of new intermediates suitable for the preparation of artificial structures, which comprises acting upon a cellulose xanthate with a glycerine derivative containing at least one atom of sulphur and at least one halogen atom which two elements are arranged in the molecule of the glycerine derivative in such a manner that at least one sulphur atom is attached to a carbon atom and at least one halogen atom is attached to a different carbon atom.

6. In the manufacture of artificial structures, the herein described mode of manufacture of new intermediates, which comprises reacting upon a cellulose xanthate with at least one glycerine derivative containing sulphur and halogen and which substance is a halogen derivative of an analogue of glycerine containing a sulphur atom.

7. In the manufacture of artificial structures, the herein described mode of manufacture of new intermediates, wherein a cellulose xanthate is acted upon with at least one sulphur derivative of a halogen derivative of glycerine in the molecule of which at least one halogen atom is attached to a carbon atom and at least one sulphur atom attached to another carbon atom, and at least one hydroxyl group is attached to another carbon atom.

8. A method as claimed in claim 1, wherein the cellulose xanthate used is a xanthate of a cellulose derivative containing an added organic radical.

9. The herein described new intermediate suitable for the preparation of artificial structures, which comprises a solution of the reaction product of a cellulose xanthate with a polyvalent organic compound containing at least one atom of sulphur and at least one halogen atom which two elements are arranged in the molecule of the said organic compound in such a manner that at least one sulphur atom is attached to a carbon atom and at least one halogen atom is attached to a carbon atom other than any carbon atom to which the sulphur atom is attached.

10. The herein described new intermediate suitable for the preparation of artificial structures, which comprises a solution of a product of the action of a cellulose xanthate with at least one halogen-containing sulphur-containing organic substance which is a halogen derivative of a sulphur analogue of a polyhydric alcohol.

11. The herein described new intermediate suitable for the preparation of artificial structures, which comprises a solution of a product of the action of a cellulose xanthate with at least one sulphur derivative of a halogen derivative of a polyhydric alcohol.

12. The herein described new intermediate suitable for the preparation of artificial structures, which comprises a solution of a reaction product of a cellulose xanthate with a glycerine derivative containing at least one sulphur atom and at least one halogen atom which two elements are arranged in the molecule of the glycerine compound in such a manner that at least one sulphur atom is attached to a carbon atom and at least one halogen atom is attached to a carbon atom other than any carbon atom to which the sulphur is attached.

13. The herein described new intermediate suitable for the preparation of artificial structures, which comprises a solution of a reaction product of a cellulose xanthate with at least one halogen derivative of a sulphur analogue of glycerine, which derivative contains halogen and sulphur.

14. The herein described new intermediate suitable for the manufacture of regenerated artificial structures which comprises a solution of a reaction product of a cellulose xanthate with a compound of the type containing sulphur joined to a plurality of glyceryl radicals which compound contains the grouping

$$Ha-(C_3H_5OH)-S-R,$$

in which R represents a halogen-containing organic radical, and in which Ha represents a halogen element.

15. The herein described new intermediate suitable for the preparation of artificial structures, which comprises a solution of a reaction product of a cellulose xanthate with a compound of the type

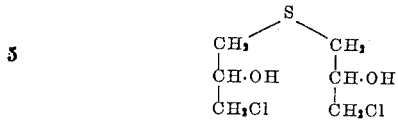

16. The herein described new intermediate suitable for the preparation of artificial structures, which comprises a solution of a reaction product of a cellulose xanthate with a compound of the type

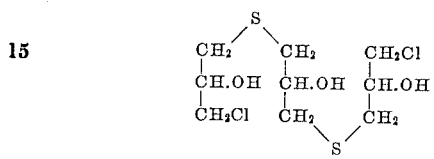

17. The herein described new intermediate suitable for the preparation of artificial structures, which comprises a solution of a reaction product of a cellulose xanthate with a compound of the type

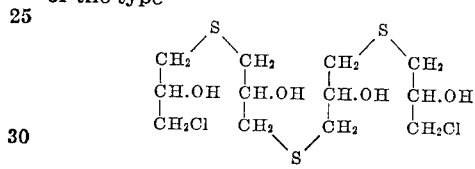

18. A process of making artificial structures, wherein an intermediate product obtained by reacting upon a cellulose xanthate with at least one sulphur derivative of a halogen derivative of a polyhydric alcohol in which the sulphur and halogen are attached to different carbon atoms, is brought into the appropriate shape and then acted upon with an agent which has a coagulating effect on the shaped material.

19. A process of making artificial structures in which an intermediate product produced by reacting upon a cellulose xanthate with a polyvalent organic compound containing at least one atom of a halogen element and at least one atom of sulphur and at least one hydroxyl group, the sulphur atom and halogen being arranged in the molecule of the said organic compound with at least one sulphur atom attached to carbon and at least one halogen atom attached to carbon, which intermediate is brought into the appropriate shape and then acted upon with an agent which has a coagulating effect on the shaped material.

20. A process of making artificial structures, wherein a product of the reaction of a cellulose xanthate with an organic compound containing at least one sulphur atom attached to a carbon atom and at least one halogen atom attached to a different carbon atom, is brought into the appropriate shape and acted upon with an agent which has a coagulating effect on the shaped material.

21. A process of making artificial structures from an intermediate which is a reaction product of a cellulose xanthate with a glycerine derivative containing at least one sulphur atom attached to a carbon atom and at least one halogen atom attached to a carbon atom other than any carbon atom to which the sulphur atom is attached, which process comprises forming such solution into the appropriate shape, and acting upon the same with an agent which has a coagulating effect on the shaped material.

22. A process of making artificial structures, wherein a product obtained by acting upon a cellulose xanthate with at least one sulphur derivative of a halogen derivative of glycerine, is brought into the appropriate shape and acted upon with an agent which has a coagulating effect on the shaped material.

23. A process of making artificial structures, wherein a product obtained by contacting a cellulose xanthate with at least one derivative of glycerine containing halogen and sulphur, in the molecule of which at least one halogen atom is attached to a carbon atom and at least one hydroxyl group is attached to another carbon atom, and a sulphur atom is attached to a third carbon atom, is brought into the appropriate shape and acted upon with an agent which has a coagulating effect on the shaped material.

24. In the process of making artificial structures, wherein a xanthate of a cellulosic body is brought into the appropriate shape and acted upon with an agent which has a coagulating effect on the shaped material and a plasticizing effect on the freshly coagulated material, the herein described improvement in which the xanthate of the cellulosic body is a product obtained by contacting cellulose xanthate with a polyvalent organic compound containing at least one atom of sulphur and at least one halogen atom and at least one hydroxyl group, a sulphur atom and a halogen atom in said organic compound being attached to separate carbon atoms.

25. A process of making artificial structures which comprises making an intermediate product by contacting a cellulose xanthate with at least one derivative of glycerine containing both halogen and sulphur, forming said intermediate product into the appropriate shape and acting upon the same with an agent which has a coagulating effect on the shaped material and a plasticizing effect on the freshly coagulated material.

26. A process of making artificial structures, which comprises (a) contacting a solution containing cellulose xanthate with at least one sulphur-containing halogen-containing hydroxyl-containing derivative of a polyhydric alcohol to produce a viscous liquid intermediate, then (b) forming the said intermediate into the appropriate shape, then (c) acting upon said shaped intermediate with an agent which has a coagulating effect on the shaped material, and (d) then acting on the freshly coagulated structure with an agent which has a plasticizing effect upon the same.

27. A process of making artificial structures which comprises, (a) contacting a cellulose xanthate with a glycerine derivative containing at least one atom of sulphur and at least one halogen atom, at least one sulphur atom being attached to a carbon atom and at least one halogen atom being attached to another carbon atom, to produce an intermediate, (b) forming said intermediate into the appropriate shape, and (c) acting upon the shaped intermediate with an agent which has a coagulating effect on the shaped material and (d) then acting on the freshly coagulated structure with an agent which has a plasticizing effect on the same.

28. In the process of making artificial structures, by bringing a solution of a xanthate of a cellulosic body into the appropriate shape and acting upon the same with an agent which has a coagulating effect on the shaped material and with an agent which has a plasticizing effect on the freshly coagulated material; the improvement which comprises, treating as the xanthate, a product obtained by contacting a cellulose xanthate with at least one sulphur-containing halogen-containing derivative of glycerine.

29. In the process of making artificial structures, wherein a solution of a xanthate of a cellulosic body is brought into the appropriate shape and acted upon with an agent which has a coagulating effect on the shaped material and then with an agent which has a plasticizing effect on the freshly coagulated material; the improvement as shown herein, in which the xanthate so treated is a reaction product obtained by reacting upon a cellulose xanthate with at least one sulphur-containing halogen-containing derivative of glycerine and which derivative also contains at least one hydroxyl group.

30. A process of making artificial structures, which comprises bringing a solution of an intermediate product, obtained by contacting a cellulose xanthate with at least one derivative of glycerine in the molecule of which at least one halogen atom is attached to a carbon atom and at least one sulphur atom is attached to another carbon atom, and at least one hydroxyl group is attached to another carbon atom, into the appropriate shape and acting upon this shaped solution with an agent which has a coagulating effect on the shaped material and then with an agent which has a plasticizing effect on the freshly coagulated material.

31. Artificial structures composed in large part at least, of a cellulosic body, and which, after being extracted with hot pyridine, contain organically bound sulphur, and on being decomposed with hydriodic acid, still yield $C_3H_7I$.

32. Artificial threads composed in large part at least, of a cellulosic body, and having a dry tenacity exceeding 2 grams per denier which, after being extracted with hot pyridine, contain organically bound sulphur and, on being decomposed with hydriodic acid, still yield $C_3H_7I$.

33. Artificial structures composed in large part, at least, of a cellulosic body, and which, after being extracted with hot pyridine and with dilute caustic alkali solution at room temperature, contain organically bound sulphur, and which, on being decomposed with hydriodic acid, still yield $C_3H_7I$.

34. Artificial threads composed in large part, at least, of a cellulosic body, and which, after being extracted with hot pyridine and with dilute caustic alkali solution at room temperature, contain organically bound sulphur and, which, on being decomposed with hydriodic acid, still yield $C_3H_7I$.

LEON LILIENFELD.